T. SÄHRIG.
PROTECTIVE DEVICE FOR ELECTRODES.
APPLICATION FILED SEPT. 25, 1906.
963,809.
Patented July 12, 1910.
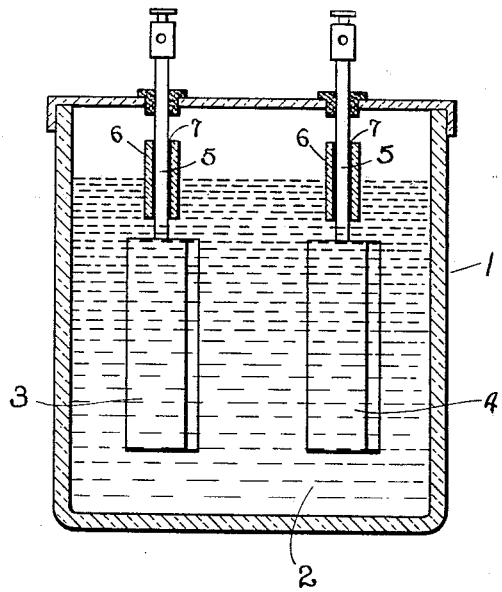
Witnesses
M. L. Byng
Allen Oxford
Inventor
Theodor Sährig.
by Albert S. Davis
Atty.

UNITED STATES PATENT OFFICE.

THEODOR SÄHRIG, OF BERLIN, GERMANY, ASSIGNOR TO GENERAL ELECTRIC COMPANY, A CORPORATION OF NEW YORK.

PROTECTIVE DEVICE FOR ELECTRODES.

963,809.

Specification of Letters Patent. Patented July 12, 1910.

Application filed September 25, 1906. Serial No. 336,128.

*To all whom it may concern:*

Be it known that I, THEODOR SÄHRIG, a subject of the Emperor of Germany, residing at Berlin, have invented certain new and useful Improvements in Protective Devices for Electrodes, of which the following is a specification.

In the operation of unipolar cells, particularly asymmetric rectifiers, it has been demonstrated that the asymmetric electrodes (aluminum or the like) are particularly affected at that point of the current supply conductor which lies close to the fluid surface. This is due to the fact that this particular part of the electrode is imperfectly "formed", or in other words, that the layer of oxid which tends to prevent current from flowing is imperfectly made and therefore, easily broken down to permit the passage of current. Energy losses and corresponding decrease in effectiveness are the result. The simplest method of obviating these difficulties must be sought in protecting the parts mentioned from the effect of the current by means of fluid tight sealing. Experiments undertaken in this direction have shown that there are only a few means that insure effective protection of the current supply leads. Lacquer coatings, or insulating material surrounding the leads does not serve the purpose, and even protecting coverings secured by means of a cementing agent which becomes hard, for example cement, are unsatisfactory, since the masses of cement become full of cracks and the electrolyte is able to penetrate to the parts which are to be protected.

The object of the present invention is a protecting device for the current supply conductors or electrodes by means of which all the above named difficulties are avoided.

The figure of the accompanying drawing shows one application of my invention.

In the drawing a glass jar 1 contains an electrolyte 2 in which are suspended suitable electrodes 3 and 4 of any desired size and shape. These electrodes may be of aluminum or any other material suitable for use with an electrolyte in an electrolytic rectifier, condenser, asymmetric conductor, and the like.

The parts 5 of the electrodes exposed to the incomplete oxidation of the electrolyte near the surface of the liquid are protected with coverings or bushings 6 composed of any material which is adapted to resist the chemical effects of the electrolyte, such for instance as glass, porcelain, hard rubber, or the like. These coverings or bushings are secured to the rods by a cementing means 7 which does not become brittle or breakable by reason of great cohesive and adhesive power, even in a cold condition, that is, the material used is adapted by its flexibility or plasticity to follow the movements of the electrode material produced by temperature variations, without cracking or separating from the electrode material.

Many cementing means possessing these properties are tar, asphalt, and other bituminous substances, and their mixtures with fats, oils, gums and the like.

The protecting coverings cemented to the current supply leads by such cementing masses have given extremely satisfactory results and no disturbances of any kind appear even after long continued use.

It is evident that besides the above named particularly adapted bituminous materials, those cementing materials may be employed which, in consequence of chemical resistance and by reason of great flexibility, satisfy the above enumerated difficulties.

What I claim as new and desire to secure by Letters Patent of the United States, is,—

1. A protecting device for electrodes of asymmetric electrolytic cells consisting of a protective covering extending below the fluid level and composed of rigid material adapted to resist chemical effects of the electrolyte, said covering being secured to the part to be protected by a plastic cement which is chemically resistant to the electrolyte.

2. The combination with an electrode, of an electrolyte in contact therewith, and a rigid chemically resistant covering secured to said electrode with a plastic cement and protecting that part of the electrode located near the surface of the electrolyte.

3. A protecting device for aluminum electrodes of electrolytic cells, consisting of a protective covering extending below the fluid level and composed of rigid material adapted to resist the chemical effect of the electrolyte, said covering being secured to the part to be protected by a cement consisting of plastic mineral substances.

In witness whereof, I have hereunto set my hand this eighth day of September, 1906.

THEODOR SÄHRIG.

Witnesses:
    HAMBURGER,
    G. KRICKEBEN.